United States Patent [19]
Saito et al.

[11] Patent Number: 5,846,467
[45] Date of Patent: Dec. 8, 1998

[54] GROMMET WATER-PROOFING METHOD AND WIRE-HARNESS LOOSING JIG

[75] Inventors: Takahiro Saito; Norihiro Yoneyama; Kenji Usui; Masaya Uchida, all of Shizuoka, Japan

[73] Assignee: Yazaki Corporation, Tokyo, Japan

[21] Appl. No.: 661,085

[22] Filed: Jun. 10, 1996

[30] Foreign Application Priority Data

Jun. 12, 1995 [JP] Japan .................................... 7-144861

[51] Int. Cl.$^6$ ................................................ B29C 39/02
[52] U.S. Cl. ......................... 264/263; 264/265; 264/275; 264/277
[58] Field of Search .................................. 264/263, 267, 264/273, 277, 272.14, 272.15, 275, 265

[56] References Cited

U.S. PATENT DOCUMENTS

| | | | |
|---|---|---|---|
| 4,814,028 | 3/1989 | Sawaki et al. | 264/272.14 |
| 5,270,487 | 12/1993 | Sawamura | 174/31 R |
| 5,499,823 | 3/1996 | Fukui | 277/1 |
| 5,567,916 | 10/1996 | Napiorkowski et al. | 174/153 G |
| 5,635,678 | 6/1997 | Yasukuni | 174/152 G |

FOREIGN PATENT DOCUMENTS

| | | |
|---|---|---|
| 1165120 | 3/1964 | Germany . |
| 1-58222 | 4/1989 | Japan . |

*Primary Examiner*—Jan H. Silbaugh
*Assistant Examiner*—Mark Eashoo
*Attorney, Agent, or Firm*—Armstrong, Westerman, Hattori, McLeland & Naughton

[57] ABSTRACT

A method and jig for loosing electric wires of a wire harness passed through a grommet are disclosed. A wire harness is clamped at the front and rear of a grommet. One clamping portion of the jig is rotated to twist the wire harness and thereafter inverted to loose it. Otherwise, the one clamping portion is moved in a direction of compressing the wire harness. The jig includes a fixing-side clamping portion for clamping the one end of a wire harness, a guide rail extending in a longitudinal direction of the wire harness, a bearing slidably engaged with the guide rail; a lock portion for locking said bearing to the guide rail, a circular rotating member, supported by said bearing, for rotating the wire harness in a circumferential direction of the wire harness; and a movable-side clamping portion, integrally attached to the rotating member, for clamping the other end of said wire harness. The rotating member may have a spiral cam groove, and the bearing may have an engagement protrusion to be engaged with the cam groove so that when the one clamping portion is inverted, the rotating member can move in its longitudinal direction. The one clamping portion may include a rachet mechanism. Further, the one clamping portion may be shifted in a direction of compressing the wire harness by a motor. Thus, a sealing agent can be surely injected among the electric wires of the wire harness.

1 Claim, 11 Drawing Sheets

F I G. 6
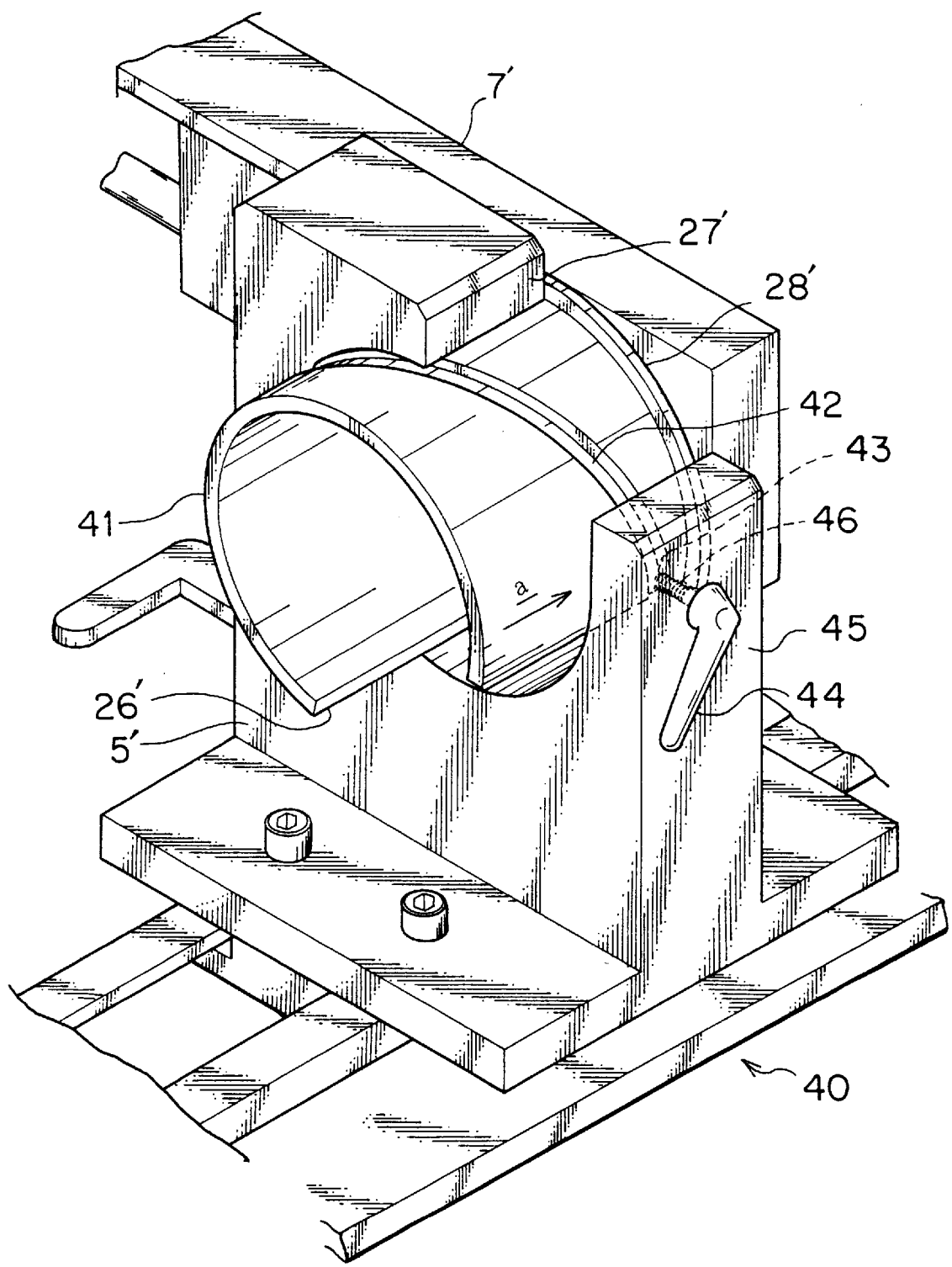

GROMMET WATER-PROOFING METHOD AND WIRE-HARNESS LOOSING JIG

BACKGROUND OF THE INVENTION

1. Field of the Invention

The present invention relates to a grommet water stopping method and a wire-harness loosing jig which can loose electric wires of a wire-harness in a grommet to surely inject a sealing agent among electric wires of the wire harness.

2. Description of the Prior Art

FIG. 16 illustrates a conventional grommet water stopping method in which a wire harness 83 is passed through a small diameter portion 82 of a resilient cup-shaped grommet 81 made of synthetic resin and the cup-shaped grommet 81 is filled with a sealing agent 84 in order to prevent water from invading from the small-diameter portion 83. The sealing agent 84 is in a muddy liquid state which will be converted into a rubber state when it is left as it is.

The above prior art, however, has a disadvantage in that water invades from gaps 85 among the electric wires constituting the wire harness 83.

In order to overcome the above disadvantage, J-UM-A-1-58222 proposes a technique in which as shown in FIG. 17, each of electric wires has a wave curve 88 and a sealing agent 90 is caused to fill gaps 89 formed by the wave curves 88. In this technique, to form wave curves 88 for each electric wire, one by one, is very troublesome. Where the curves 88 are not located within grommet 91, gap 89 may not be formed between the electric wires and the sealing agent 90 may not fill the gaps between the electric wires.

SUMMARY OF THE INVENTION

An object of the present invention is to provide a grommet water-proof method and an electric wire loosing jig which can inject a sealing agent between the electric wires simply and without much labor and without difference in work.

In accordance with one aspect of the present invention, the operation of rotating and inverting a movable-side clamping portion or the operation of shifting such clamping portion permits a wire harness to be compressed in an axial direction so that the electric wires of the wire harness can be easily loosened. For this reason, a sealing agent can be injected among the electric wires without much labor and without difference in work.

In accordance with another aspect of the present invention, also when the movable-side clamping portion is inverted, such clamping portion is shifted towards a fixing-side clamping portion. Thus, the degree of loosing the wire harness can be further increased at the rotating angle equal to the above aspect of the present invention. This increases working accuracy in the operation of loosing the wire harness.

In accordance with still another aspect of the present invention, a rachet mechanism prevents the movable-side clamping portion from being inverted at the time of twisting the wire harness, thus increasing workability.

The above and other objects and features of the present invention will be more apparent from the following description taken in conjunction with the accompanying drawings.

BRIEF DESCRIPTION OF THE DRAWINGS

FIG. 6 is a perspective view of the main part of the second embodiment of the present invention;

DESCRIPTION OF THE PREFERRED EMBODIMENTS

Embodiment 1

Figure 1:
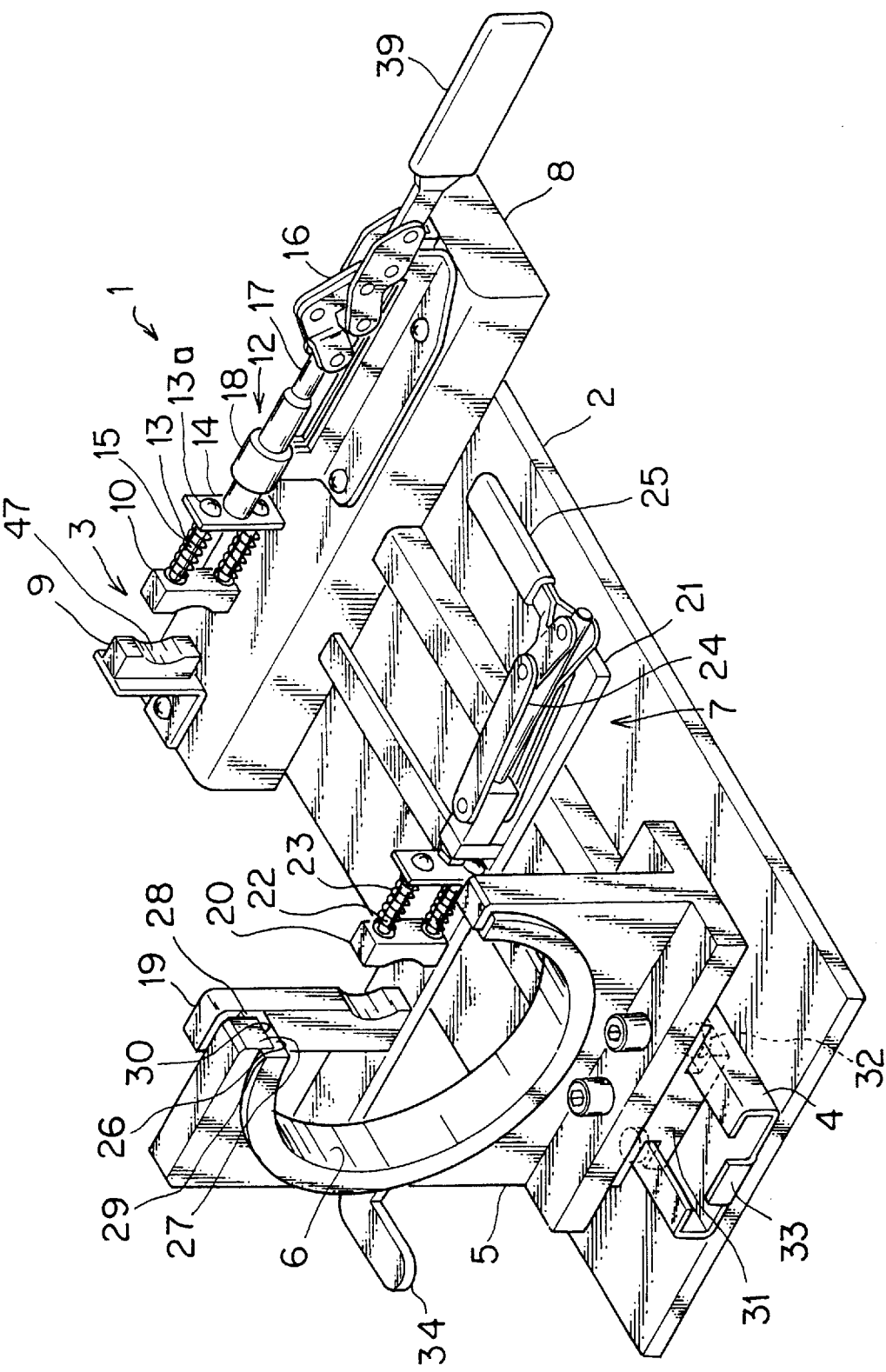
FIG. 1 is a perspective view showing the first embodiment of a wire harness loosing jig according to the present invention.

FIG. 1 shows the first embodiment of a wire harness loosing jig (grommet water proof jig), generally designated 1, according to the present invention.

The electric wire jig 1 includes an L-shaped base plate 2, a first clamping portion, generally designated 3, fixed adjacent one end of the base plate 2, a guide rail 4, extending in a direction orthogonal to the first clamping portion 3, adjacent the other end of the base plate 2, a bearing 5 slidably engaged with the guide rail 4, a circular rotating member 6 mounted on the bearing 5 and a movable-side second clamping portion 7 fixed to the rotating member 6 for rotation on rotating member 6.

The first clamping portion 3 includes a rectangular base stand 8 fixed to base plate 2, a pair of clamps 9 and 10 (the first clamp 9 fixed on the base stand 8 and the second clamp 10 movable towards and away from the first clamp 9), and a clamper 12 for shifting the second clamp 10 toward and away from the first fixed clamp 9 by the operation of a lever 39. Each of the clamps 9 and 10 have an arc-shaped or V-shaped contact face 47 for clamping the wire harness 11 therebetween (see FIG. 2).

The second clamp 10 is connected to a shifting plate 14 of the clamper 12 through guide rods 13. One ends of the guide rods 13 penetrate through the shifting plate 14 so that the heads 13a of the guide rods 13 abut on the shifting plate 14. Springs 15 are elastically provided between the shifting plate 14 and the clamp 10. Because the second clamp 10 is pushed by the spring 15 by the operation of the lever 39, a wire harness can be tightly sandwiched between the first clamp 9 and second clamp 10.

The clamper 12 that is commercially available includes a <-shaped link 16 connected to the stem of the lever 39, a slide bar 17 whose one end is attached to the shifting plate 14 and a bearing 18 for supporting the slide bar 17. In FIG. 1, the lever 39 is located on the side for releasing the clamps.

On the side of the movable-side clamping portion 7, another pair of third and fourth clamps 19 and 20 are located oppositely to the above pair of first and second clamps 9 and 10. The third clamp 19 is attached to a rectangular plate 21 in parallel to the base stand 8, and as in the fixing-side clamping portion 3, the fourth clamp 20 is connected to a clamper 24 through a guide lock 22 and springs 23. The clamper 24 is attached to the plate 21 and an operation lever 25 for the clamper 24 is located on the side for releasing the clamps.

The third clamp 19 and the plate 21 are fixed to the rotating member 6 by soldering. The rotating member 6 and the bearing 5 have recess openings 26 and 27 through which the wire harness 11 pass, respectively. The openings 26 and 27 are recessed by about ¼ to ¾ of their circumference of the circle. The rotating member 6 is provided with flanges 28 and 29 at its front and rear. The flanges 28 and 29 serve as rotating guides on the bearing 5. It should be noted that the rotating center of the rotating member 6 is coincident on the clamping center of each of the clamps 9, 10, 19 and 20.

The rotating member 6 is rotatable over 180° integrally to the movable-side clamping portion 7. In order to rotate the movable-side clamping portion over 180°, a stopper (not shown) may be provided between the rotatable member 6 and the bearing 5, or between the base plate 2 and the movable-side clamping portion 7. For example, the rotating member 6 is provided with a circumferential arc groove (not shown) and the bearing 5 is provided with a stopper shaft (not shown) engaged with the arc groove.

The bearing 5 which rotatably supports the rotating member 6 has a rectangular block shape including the recess opening 27 at its upper part, a circular through-hole 30 supporting the rotating member 6 with no clearance at its intermediate part and a sliding portion 31 slidably engaged with the guide rail 31 at its bottom part. The slide portion 31 may have a roller 32 so that it can move smoothly. The guide rail 4 is provided with a stopper 33 at its one end and extends to the base stand 8 of the fixing side clamping portion 3 at its other end.

The bearing 5 is provided with a lock lever 34. The bearing 5 can be locked with the guide rail 4 by operating the lock lever 34. The lock lever 34 may be provided with a cam shaft (not shown) and a pressing portion which is in contact with the cam shaft and can be pressed on the guide rail 4.

Figure 2:
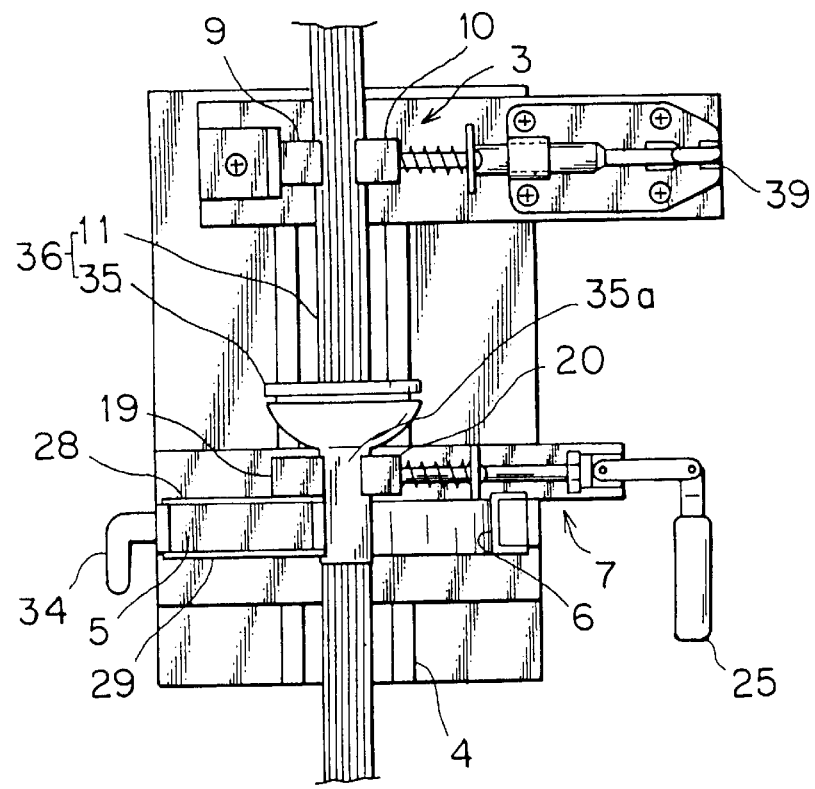
FIG. 2 is a plan view for illustrating the operation (fixed state of a wire-harness) of a wire harness loosing jig in the first embodiment.
Figure 3:
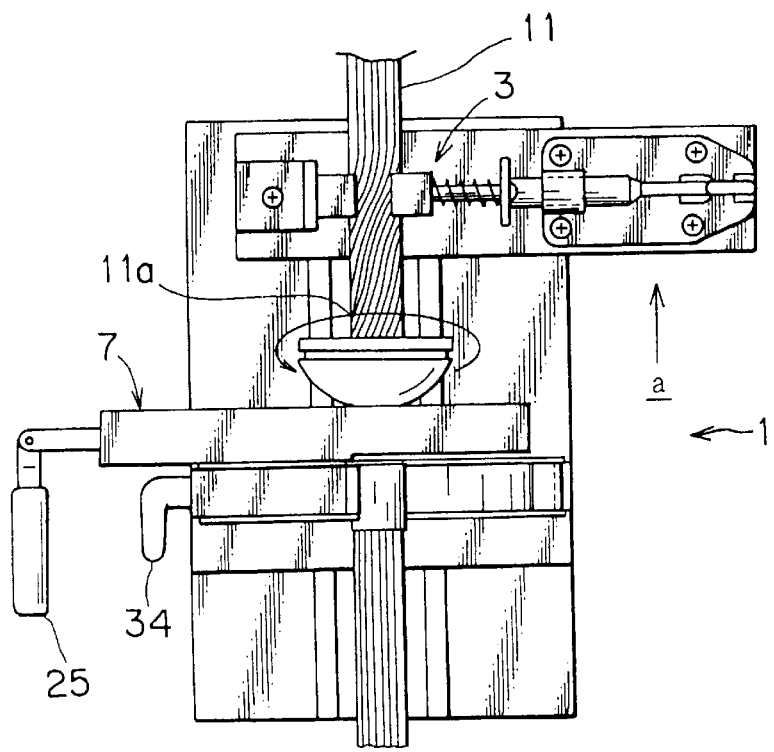
FIG. 3 is a plan view showing the twisted state of the wire harness in the first embodiment.
Figure 4:
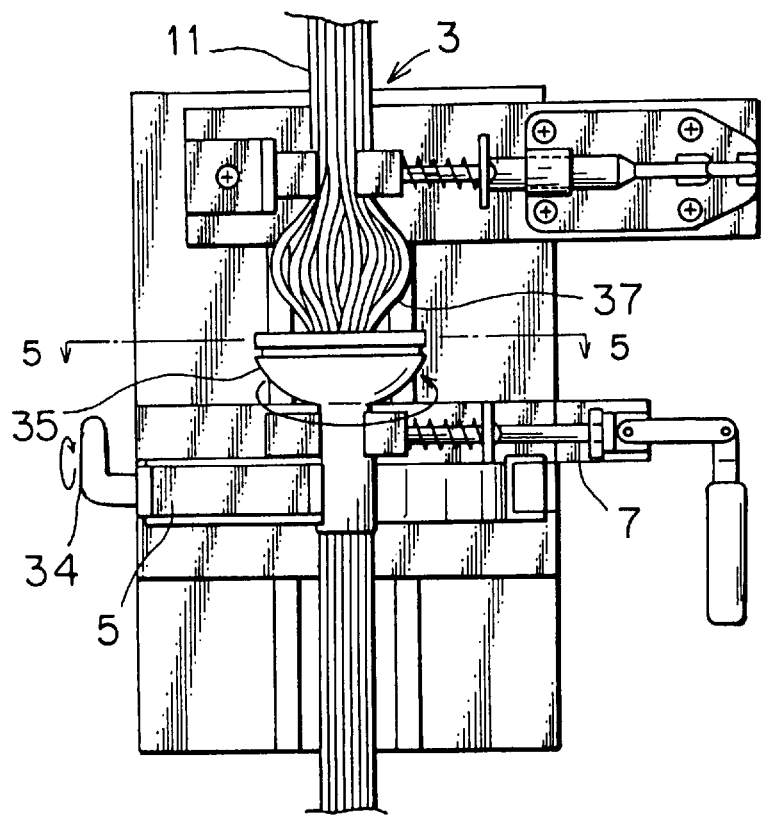
FIG. 4 is a plan view showing the state where the wire harness has been loosed in the first embodiment.

As best shown in FIGS. 2 to 4 illustrating the operation of the electric wire loosing jig as described above in the grommet water-proofing method of the instant invention, a wire harness 11 is passed through a grommet 35 having a cup shaped body open 35 open at its upper end, as shown in FIGS. 2, 3 and 4, and a reduced diameter portion 35a, at its lower end, with a passage therethrough for receiving the wire harness to form the grommet-equipped wire harness 36. First, the grommet equipped wire harness 36 is clamped by the fixing side clamping portion 3 at its one end and by the movable side clamping portion 7 at its other end together with a small diameter portion 35a of the grommet 35. In the state shown in FIG. 2, the lock lever 34 for the bearing 5 remains lock-released.

Next, as shown in FIG. 3, the movable-side clamping portion 7 is rotated by 180° to twist the wire harness 11 (the twisted portion is denoted by reference numeral 11a). In this case, the movable-side clamping portion 7 is shifted towards the fixing side clamping portion 3 in a direction of a along the guide rail 4 by a length of the wire harness 11 shortened as a result of its twisting. The wire harness 11 is twisted between the fixing side clamping portion 3 and the movable-side clamping portion 7.

Figure 5:
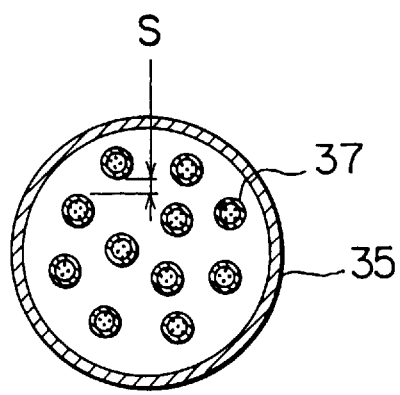
FIG. 5 is a sectional view of FIG. 4 taken along line A—A.

As shown in FIG. 4, the lock lever 34 is rotated to lock the bearing 5. Then, the movable-side clamping portion 7 is inverted by 180° towards the restored initial position. Thus, the electric wires 37 of the wire harness 11 are enlarged externally with gaps S within the grommet 35 as shown in FIG. 5. Accordingly, a sealing agent (not shown) can permeate among the electric wires 11 in grommet 35 sufficiently to waterproof the wire harness in grommet 35. The grommet 35 is filled with the sealing agent while the grommet equipped wire harness 36 is attached to the jig 1.

Embodiment 2

FIG. 6 shows the second embodiment of the wire harness loosing jig according to the present invention in which the rotary member 6 is further provided with another shifting mechanism in an axial direction.

The electric wire loosening jig 40, according to this embodiment, is provided with a cylindrical rotary member 41 that is longer than the rotating member 6 in previous first embodiment and integral to a movable-side clamping portion 7' that is the same as in the previous embodiment. The rotating member 41 is movable in the axial direction for the bearing 5' (i.e. towards the fixing side clamping portion 3). The rotating member 41 has a cam groove 42 formed on its outer peripheral surface. It is of course that the rotating member 41 and a bearing 5' have wire-harness passing-through openings 26' and 27' as in the previous embodiment, respectively.

The cam 5' is provided with a rotating lever 44 having an engagement protrusion 43 which can move on the cam groove 42. The engagement protrusion 43 is formed in a spherical shape or wedge-shape which is kept in smooth slidable contact with the cam groove 42. The rotating lever 44 has a screw portion 46 which is screwed to the side wall 45 of the bearing 5'. The tip of the screw portion 46 is communicated with the engagement protrusion 43. The rotating member 41 may have a guiding flange 28' at its one end. With the cam groove 42 engaged with the engagement 43 of the rotating lever 44, the rotating member 41 can advance towards the fixing side clamping portion 3' (in a direction of $\underset{=}{a}$, FIG. 6) by an inverting operation of the movable-side clamping portion 7'.

Figure 7:
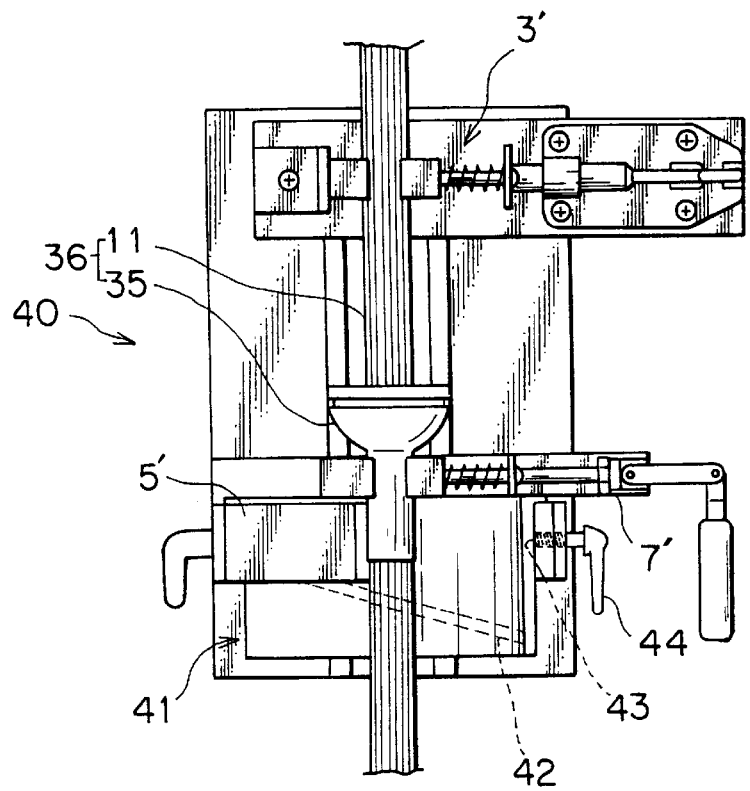
FIG. 7 is a plan view for illustrating the operation (fixed state of a wire-harness) of the wire harness loosing jig in the second embodiment.
Figure 8:
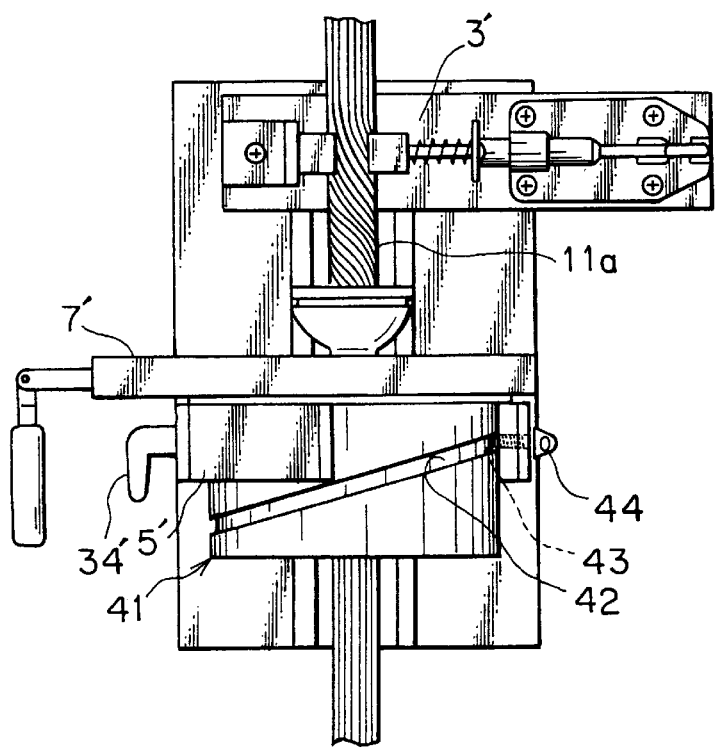
FIG. 8 is a plan view showing the twisted state of the wire harness in the second embodiment.
Figure 9:
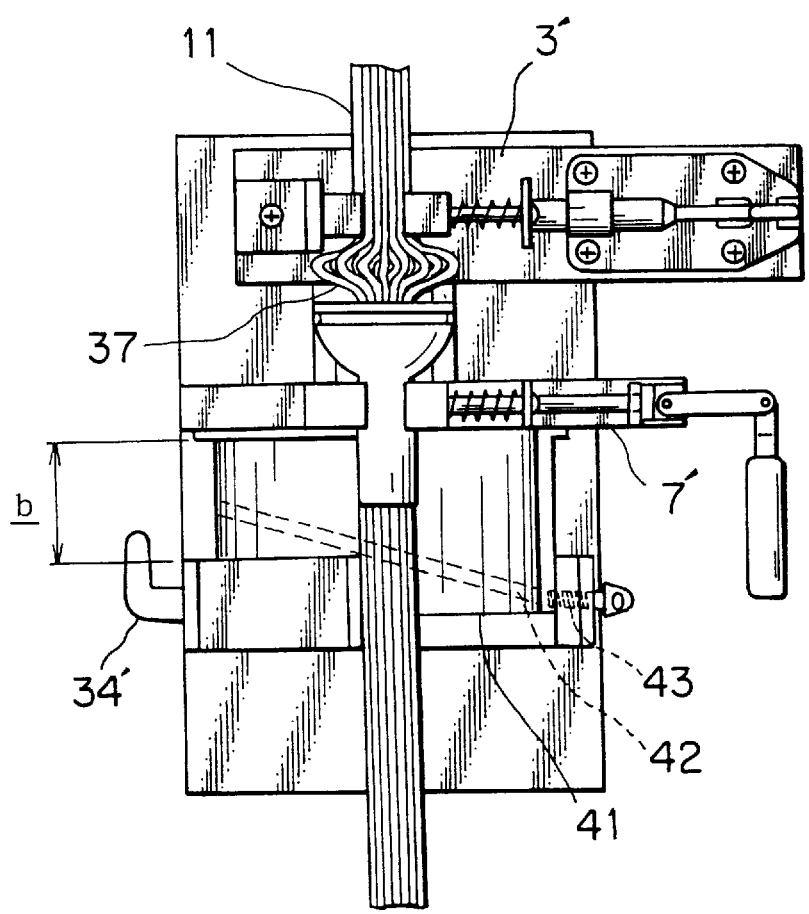
FIG. 9 is a plan view showing the state where the wire harness has been loosed simultaneously when it is inverted.

FIGS. 7 to 9 illustrate the operation of the electric wire loosening jig according to this embodiment.

First, in FIG. 7, as in the previous embodiment, both ends of the grommet-equipped wire harness 36 is attached to the clamping portions 3' and 7'. In this case, the rotating lever 44 for engagement of the cam groove 42 is placed in a relaxed state so that the engagement protrusion is left from the cam groove 42.

As shown in FIG. 8, the movable side clamping portion 7' is rotated by 180° to twist the wire harness 11 so that the movable-side clamping portion 7' is once moved towards the fixing side clamping portion 3'. Thereafter, the rotating lever 44 is rotated to engage the engagement protrusion 43 with the cam groove 42. The lock lever 34' of the bearing 5' is rotated in a locking direction as shown in FIG. 9.

Next, as shown in FIG. 9, the movable-side clamping portion 7' is inverted to the original position, i.e., the rotating member 41 is rotated integrally to the movable-side clamping portion 7' so that with the cam groove 42 in a slidable contact with the engagement protrusion 43, the rotating member 41 is secondarily shifted together with the movable-side clamping portion 7' in a direction of arrow b. Thus, the wire harness 11 is compressed by a total distance of the first shift and the second shift so that the electric wires 37 are further loosened. In accordance with this embodiment, because the gaps among the electric wires can be further increased, the sealing agent can permeate among the electric wires more readily.

Embodiment 3

Figure 10:
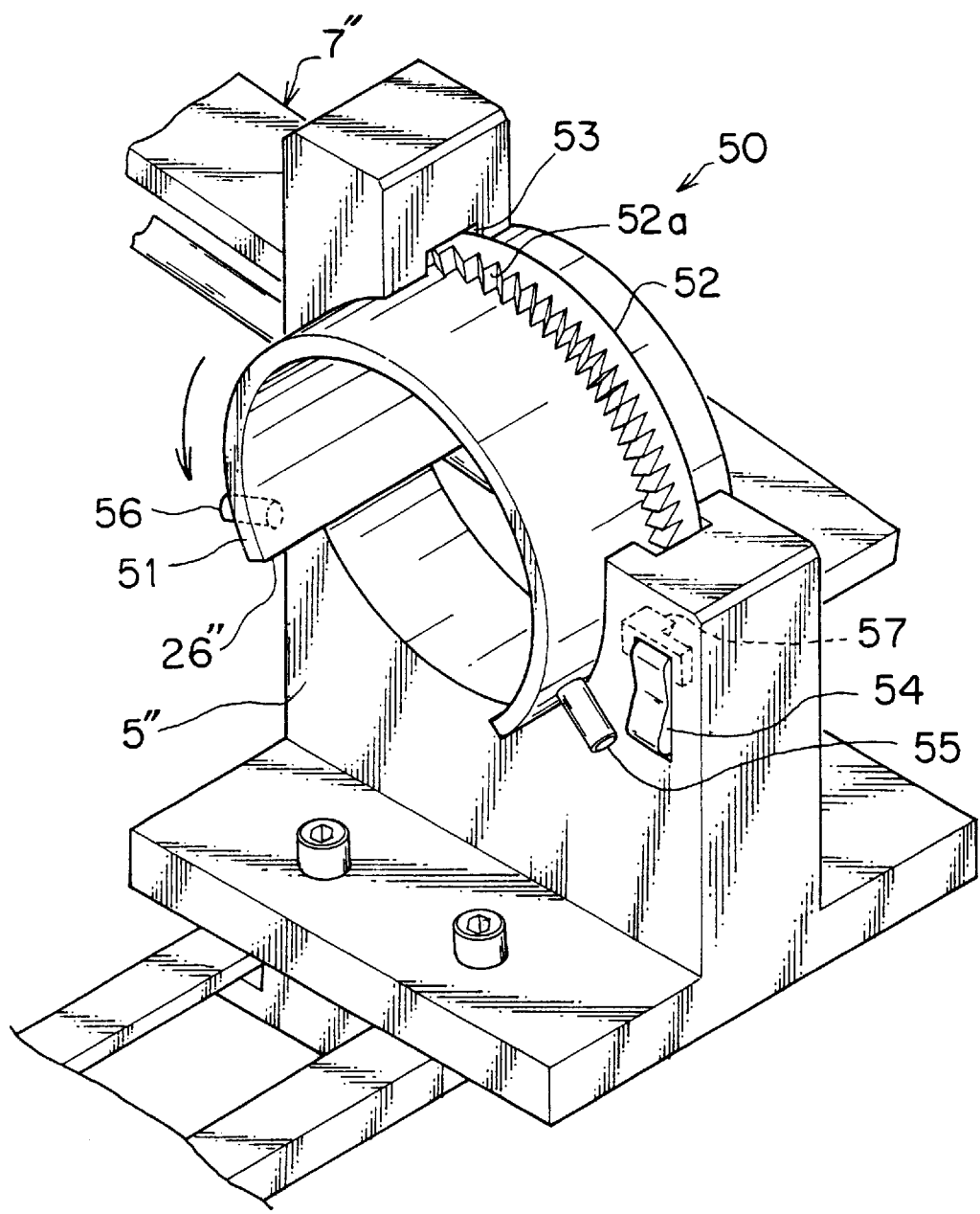
FIG. 10 is a perspective view of the third embodiment of the wire harness loosing jig according to the present invention.

FIG. 10 shows the third embodiment of the wire harness loosing jig according to the present invention in which the rotating member 51 is provided with a rachet mechanism to rotate a movable-side clamping portion 7" more readily.

As shown in FIG. 10, a grommet water-proof jig 50 is provided with an arc rachet gear 52 along and integral to the outer peripheral surface of a circular or cylindrical rotating member 51. The rachet gear 52 is bent in an arc shape along the rotary member 51 and has a tooth portion 52a on one side from which the rotating member 51 protrudes. The bearing 5" which supports the rotating member 51 includes a passing-through hole 53 for the rachet gear 52.

The bearing 5" includes a switch 54 for rachet switching. The rotating member 51 includes a pair of short-cylindrical pressing protrusions 55 and 56 for switch on/off. The pressing protrusions 55 and 56 are located near opposite ends of a recess opening 26" for passing the wire harness. The switch portion 54 is connected to an engagement piece 57 spring-urged for the rachet gear 52, which can rotate the rachet gear 52 mechanically in only one direction or 180° rotation (FIG. 3) to prevent the inadvertent return due to the twisting repelling force of the wire harness 11. The switch portion 54 holds the state changed by the pressing protrusions 55 and 56.

Figure 11:
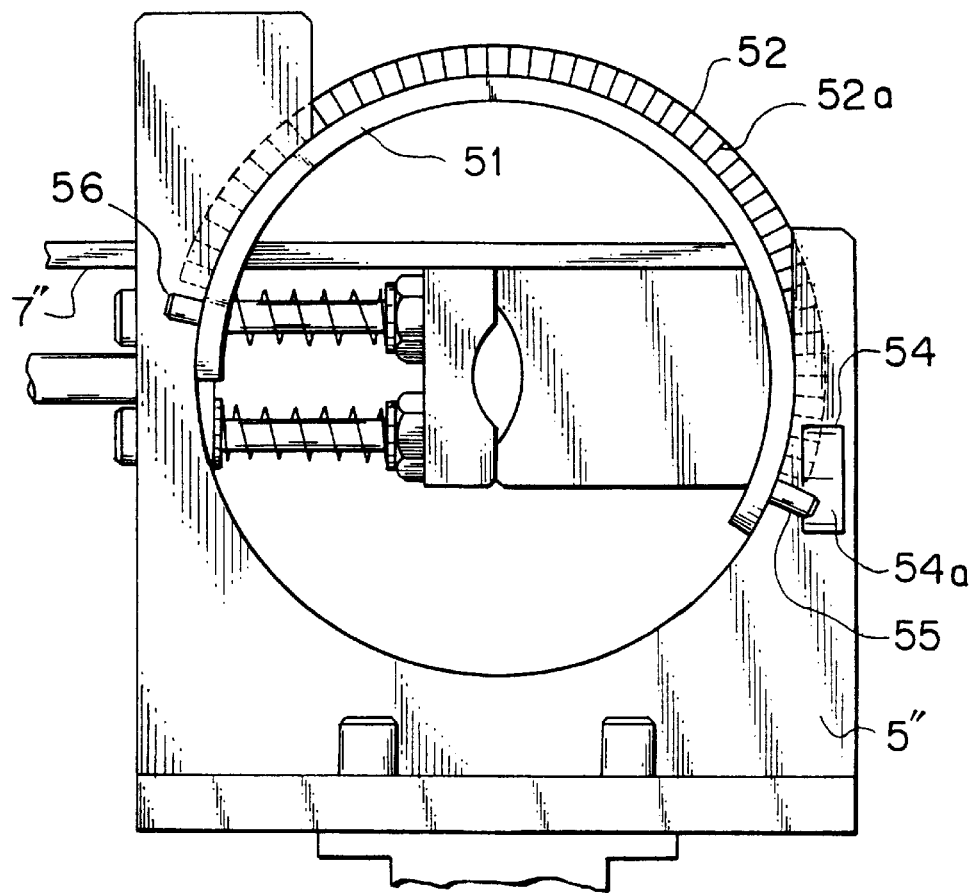
FIG. 11 is a front view of the state where the clamping portion on a movable side in the third embodiment has been rotated.
Figure 12:
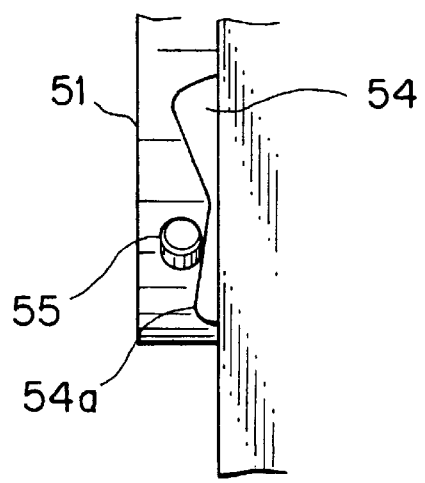
FIG. 12 is a side view of the state of a rachet exchange switch corresponding to FIG. 11.

FIG. 11 shows the state where the wire harness 11 has been twisted as a result of 180° rotation of the rotary member 51 in a counter-clockwise direction as shown in FIG. 10. As shown in FIG. 12, the one pressing protrusion 55 presses the one end (lower part) 54a of the switching portion 54 to release the rachet gear 52 so that the rotating member 51 can be inverted. Thus, the movable-side clamping portion 7" integral to the rotating member 51 is inverted as shown in FIG. 13 thereby to loose the electric wires 37 as shown in FIGS. 4 and 5 directed to the first embodiment of the present invention.

Figure 13:
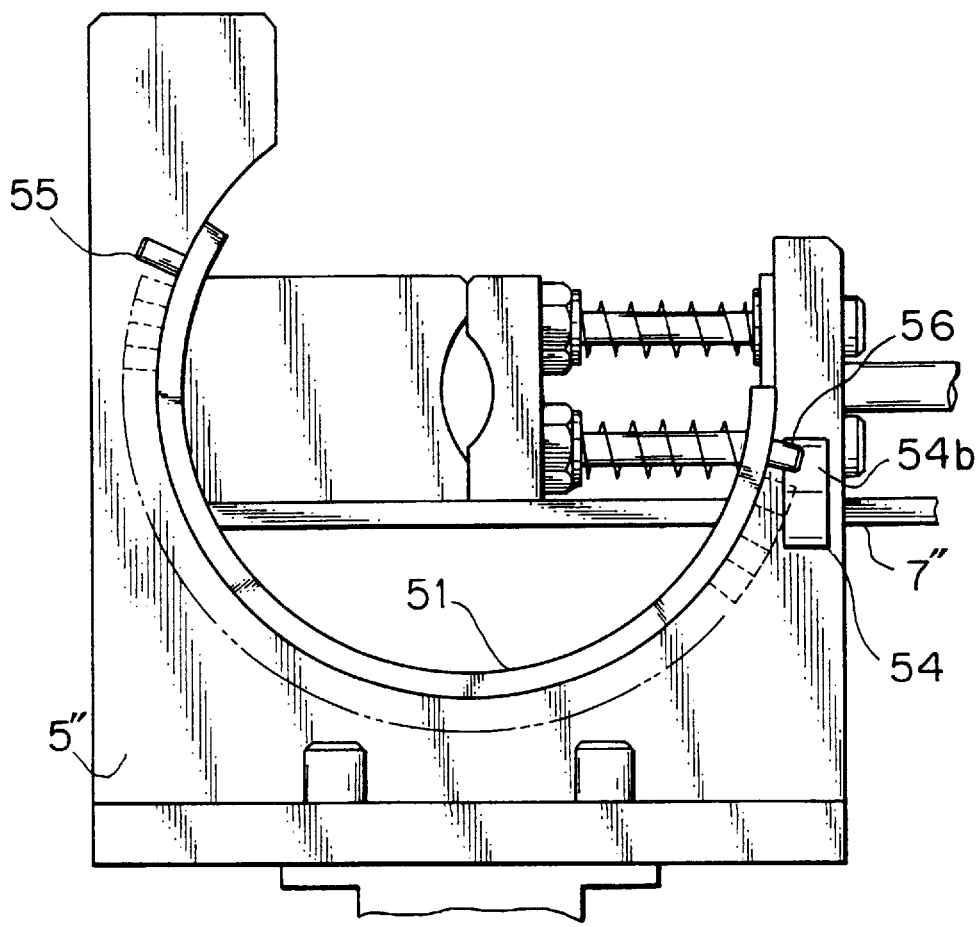
FIG. 13 is a front view of the state where the movable-side clamping portion has been inverted.
Figure 14:
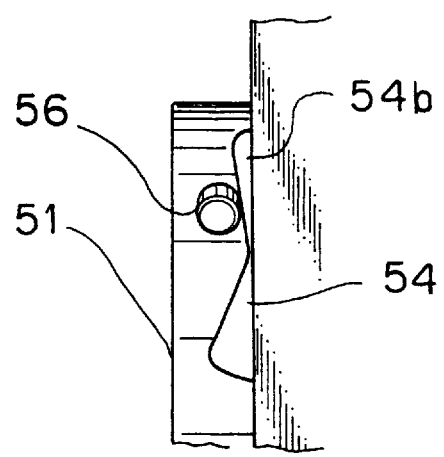
FIG. 14 is a side view of the rachet exchange switch corresponding to FIG. 13.

In the state where the inversion has been completed as shown in FIG. 13, the other pressing protrusion 56 presses the other end (upper part) 54b of the switching portion 54 as shown in FIG. 14 so that the rachet is operable. Specifically, as shown in FIG. 10, the piece 57 is engaged with the rachet gear 52. Thus, another grommet-equipped wire harness 36 can be surely twisted with no return.

Embodiment 4

Figure 15:
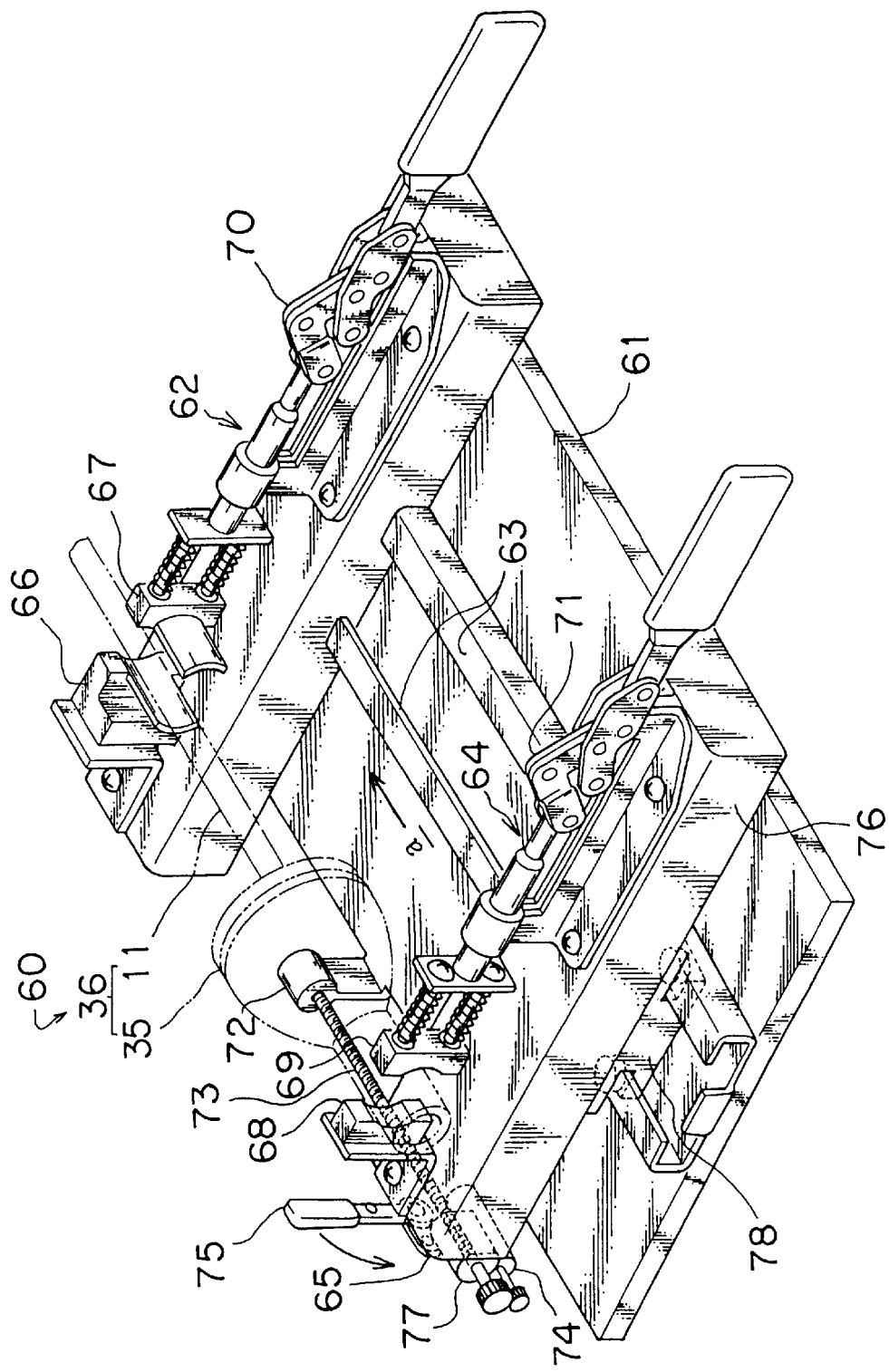
FIG. 15 is a perspective view of the fourth embodiment of the wire harness loosing jig according to the present invention.
Figure 16:
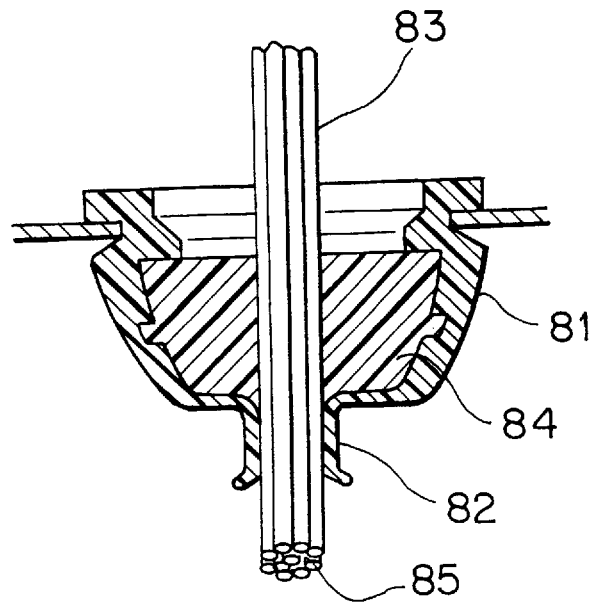
FIG. 16 is a longitudinal sectional view of a conventional grommet waterproofing method.
Figure 17:
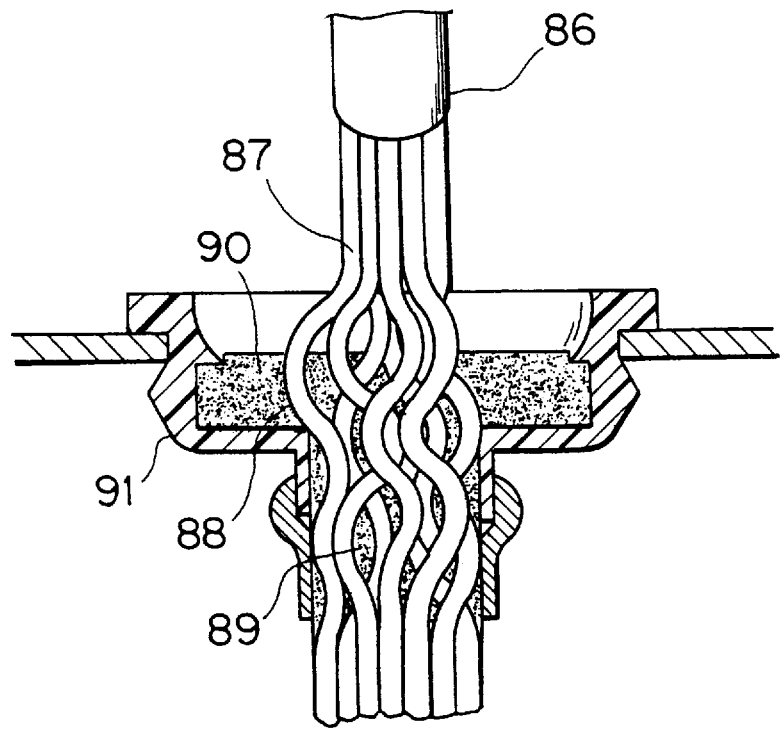
FIG. 17 is a longitudinal sectional view of another grommet waterproofing method.

FIG. 15 shows the fourth embodiment of the electric wire loosening jig according to the present invention.

The electric wire loosening jig 60 includes a rectangular base plate 61, a fixing-side clamping portion 62 attached to one end of the base plate 61, guide rails 63 provided in a longitudinal direction on the base plate 61, a movable-side clamping portion 64 slidably engaged with the guide rail 63 and a driving mechanism 65 for shifting the movable-side clamping portion 64 in the longitudinal direction of the wire harness 11.

The fixing-side clamping portion 62 and movable-side clamping portion 64 are provided with a pair of clamps 66 and 67, and another pair of clamps 68 and 69, respectively, and clampers 70 and 71 for shifting the clamps 67 and 69 in a radial direction of the wire harness, respectively. The movable-side clamping portion 64 has a slide portion 78 at the bottom engaged with guide rail 63. The driving mechanism 65 includes a screw shaft 73 rotatably supported by a bearing 72 on the side of the base plate 61, a motor 74 for driving the screw shaft 73 and an manipulating lever 75 for driving the motor 74. The intermediate portion of the screw shaft 73 is screwed on the nut 77 of a base stand 64 of the movable side clamping portion 64.

In operation, after the grommet-equipped wire harness 36 is attached between both clamps 62 and 64, the operation lever 75 is put down. Then, the motor 74 starts to rotate. Eventually, the movable-side clamping portion 64 is shifted along the screw shaft 73 towards the fixing-side clamping portion 62, or in a direction (an arrow a, FIG. 15) of compressing the wire harness. Thus, the electric wires constituting the wire harness are loosened within the grommet 35 so that gaps for permeation of a sealing agent will be formed.

Without installing the driving mechanism, the movable-side clamping portion 64 may be manually shifted in a direction of compressing the wire harness.

What is claimed is:

1. A grommet water-proofing method, wherein a wire harness is passed through the grommet and the grommet is subsequently filled with a sealing agent, comprising the steps of:

providing a grommet having an enlarged diameter cup shaped open end and a smaller diameter end portion having a passageway therethrough;

passing a wire harness through said passageway;

engaging said wire harness above the cup shaped open end of said grommet with a first pair of clamps, thereby clamping said wire harness at a first location above the cup shaped open end of said grommet;

engaging said smaller diameter end portion of said grommet, said wire harness extending through said grommet, with a second pair of clamps thereby clamping said wire harness at a second location below the cup shaped open end of said grommet;

rotating said second pair of clamps, with said wire harness clamped therein, in a first rotational direction while holding said first pair of clamps with said wire harness clamped therein, in fixed rotational and axial positions, thereby twisting said wire harness; inverting said second pair of clamps with said wire harness clamped therein in a second rotational direction opposite of said first rotational direction to loosen wires of said wire harness;

moving said second pair of clamps, with said wire harness clamped therein, axially toward said first pair of clamps held in said fixed rotational and axial positions, thereby separating wires of said wire harness in said enlarged cup shaped open end of said grommet; and filing, and thereby sealing the cup shaped open end of said grommet with twisted and separated wires therein, with a water-proofing sealing agent.

* * * * *